United States Patent
Krishnamurthi et al.

(10) Patent No.: US 7,164,698 B1
(45) Date of Patent: Jan. 16, 2007

(54) HIGH-SPEED LINE INTERFACE FOR NETWORKING DEVICES

(75) Inventors: Ashok Krishnamurthi, San Jose, CA (US); Jeffrey Scott Dredge, San Jose, CA (US); Ramesh Padmanabhan, Los Altos, CA (US); Ramalingam K. Anand, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 945 days.

(21) Appl. No.: 09/752,827

(22) Filed: Jan. 3, 2001

Related U.S. Application Data

(63) Continuation-in-part of application No. 09/534,838, filed on Mar. 24, 2000, and a continuation-in-part of application No. 09/751,454, filed on Jan. 2, 2001, now Pat. No. 7,016,367.

(51) Int. Cl.
*H04J 3/02* (2006.01)
(52) U.S. Cl. ............... 370/541; 370/539; 370/545
(58) Field of Classification Search ............ 370/545, 370/539, 541, 463
See application file for complete search history.

(56) References Cited

U.S. PATENT DOCUMENTS

| | | | | |
|---|---|---|---|---|
| 5,335,325 | A | 8/1994 | Frank et al. ............ | 711/163 |
| 5,506,841 | A | 4/1996 | Sandquist | |
| 5,710,650 | A * | 1/1998 | Dugan .................. | 398/91 |
| 5,757,771 | A | 5/1998 | Li et al. | |
| 5,905,725 | A | 5/1999 | Sindhu et al. ........... | 370/389 |
| 5,909,440 | A | 6/1999 | Ferguson et al. | |
| 5,953,314 | A * | 9/1999 | Ganmukhi et al. ....... | 370/220 |
| 6,009,075 | A * | 12/1999 | Roberts et al. .......... | 370/219 |
| 6,092,178 | A | 7/2000 | Jindal et al. | |
| 6,122,281 | A * | 9/2000 | Donovan et al. ......... | 370/401 |
| 6,263,368 | B1 | 7/2001 | Martin | |
| 6,272,522 | B1 | 8/2001 | Lin et al. ............... | 709/200 |
| 6,324,580 | B1 | 11/2001 | Jindal et al. | |
| 6,327,622 | B1 | 12/2001 | Jindal et al. | |
| 6,359,900 | B1 | 3/2002 | Dinakar et al. | |
| 6,385,209 | B1 * | 5/2002 | Skirmont et al. ........ | 370/419 |
| 6,404,752 | B1 | 6/2002 | Allen, Jr. et al. | |

(Continued)

OTHER PUBLICATIONS

Padmanabhan et al.; U.S. Appl. No. 09/637,709; "Systems and Methods for Packing Data into a Destination Register;" filed Aug. 15, 2000.

(Continued)

*Primary Examiner*—Ricky Q. Ngo
*Assistant Examiner*—Andrew C. Lee
(74) *Attorney, Agent, or Firm*—Harrity Snyder, LLP

(57) ABSTRACT

Systems and methods, consistent with the present invention, provide a high-speed line interface for networking devices. Such an interface may be used in networking devices, such as routers and switches, for receiving data from, and transmitting data to, high-speed links, such as those lines carrying data at rates of 2.5 Gbit/sec, 10 Gbit/sec, and 40 Gbit/sec and more. In a preferred embodiment, the interface deserializes data from an incoming data stream onto a multi-line bus so that the data may be processed at a lower clock speed. Packets are extracted from the data on the multi-line bus and distributed among a plurality of switching/forwarding modules for processing.

23 Claims, 7 Drawing Sheets

U.S. PATENT DOCUMENTS

| | | |
|---|---|---|
| 6,424,621 B1 | 7/2002 | Ramaswamy et al. ...... 370/230 |
| 6,446,146 B1* | 9/2002 | Yamaguchi et al. ........ 710/100 |
| 6,601,084 B1 | 7/2003 | Bhaskaran et al. |
| 6,636,515 B1* | 10/2003 | Roy et al. ................. 370/395.1 |
| 6,643,719 B1* | 11/2003 | Baker .......................... 710/57 |
| 6,646,983 B1* | 11/2003 | Roy et al. .................... 370/218 |
| 6,650,641 B1 | 11/2003 | Albert et al. |
| 6,728,492 B1* | 4/2004 | Baroncelli ................... 398/154 |
| 6,741,615 B1* | 5/2004 | Patwardhan et al. ........ 370/514 |
| 6,751,743 B1* | 6/2004 | Theodoras et al. ......... 713/400 |
| 6,754,174 B1* | 6/2004 | Ben-Zur et al. ............ 370/225 |
| 6,754,217 B1* | 6/2004 | Ahn ........................ 370/395.6 |
| 6,791,947 B1 | 9/2004 | Oskouy et al. ............. 370/238 |
| 6,834,049 B1* | 12/2004 | Tomar et al. ................ 370/369 |
| 6,895,018 B1* | 5/2005 | Klish, II ...................... 370/471 |

OTHER PUBLICATIONS

Padmanabhan et al.; U.S. Appl. No. 09/706,752; "Systems and Methods for Generating a Reliable Clock for Reception and Recovery of Date;" filed Nov. 7, 2000.

U.S. Appl. No. 09/751,454, filed Jan. 2, 2001; entitled "Systems and Methods for Allocating Bandwidth for Processing of Packets," 61 pages.

U.S. Appl. No. 09/534,838, filed Mar. 24, 2000; entitled "Bandwidth Division for Packet Processing," 31 pages.

* cited by examiner

HIGH-SPEED LINE INTERFACE FOR NETWORKING DEVICES

RELATED APPLICATIONS

This application claims priority under 35 U.S.C. 120 as a continuation-in-part of U.S. patent application Ser. No. 09/534,838, entitled "Bandwidth Division for Packet Processing," filed Mar. 24, 2000, to Dyckerhoff et al., and U.S. patent application Ser. No. 09/751,454, entitled "Bandwidth Division for Packet Processing," filed Jan. 2, 2001, now U.S. Pat. No. 7,016,367, to Dyckerhoff et al. The contents of both applications are hereby incorporated by reference.

BACKGROUND OF THE INVENTION

A. Field of the Invention

The present invention relates generally to networking and, more particularly, to a high-speed line interface for networking devices.

B. Description of Related Art

A data communications network may be formed by interconnecting networking devices, such as routers and switches, through communication links. To accommodate links of different types and speeds, many networking devices include slots in which line interface cards may be inserted. Each line interface card converts signals from a respective link to packets that are routed or switched by the networking device and vice-versa. The line interface card may also perform some preprocessing on the packets before they are routed/switched. The nature of the different types of communication links is such that, in many cases, a separate line interface card may need to be specially designed for each different type of link.

Problems arise, however, with line interface cards used with high-speed communication links. Such links may provide data at a faster rate than line interface cards can process or handle. This may result in a substantial reduction in data throughput or, worse yet, data loss. Even if the line interface cards are able to process the data at the rate it is being received, appropriate switching/forwarding modules need to be available to receive packets from these line interface cards. These problems become more significant as data communication links are becoming increasingly fast and the number of links connected to networking devices is increasing.

Therefore, there is a need for a high-speed line interface for networking devices.

SUMMARY OF THE INVENTION

Systems and methods, consistent with the present invention, address this and other needs by providing a high-speed line interface. The interface divides a single data flow into a plurality of data flows for parallel data processing.

In accordance with the purpose of the invention as embodied and broadly described herein, a network device comprises a sprayer module, a plurality of preprocessing modules, a plurality of switching/forwarding modules, and a framer module. The sprayer module receives data packets and outputs the received data packets on a plurality of channels. The plurality of preprocessing modules processes the data packets received from one of the channels of the sprayer module. Each of the plurality of switching/forwarding modules receives data packets from a corresponding one of the plurality of preprocessing modules. And the framer module deserializes a stream of in-coming data onto a multi-line bus, extracts data packets from the deserialized data on the multi-line bus, and transmits the extracted data packets to the sprayer module.

Other implementations and concepts consistent with the invention are described. The invention is defined by the claims.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Systems and methods, consistent with the present invention, provide a high-speed line interface for networking devices. Such an interface may be used in networking devices, such as routers and switches, for receiving data from, and transmitting data to, high-speed links, such as those lines carrying data at rates of 2.5 Gbit/sec, 10 Gbit/sec, and 40 Gbit/sec and more. In a preferred embodiment, the interface deserializes data from an incoming data stream onto a multi-line bus so that the data may be processed at a lower clock speed. Packets are extracted from the data on the multi-line bus and distributed among a plurality of switching/forwarding modules for processing.

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Exemplary Apparatus

Figure 1:
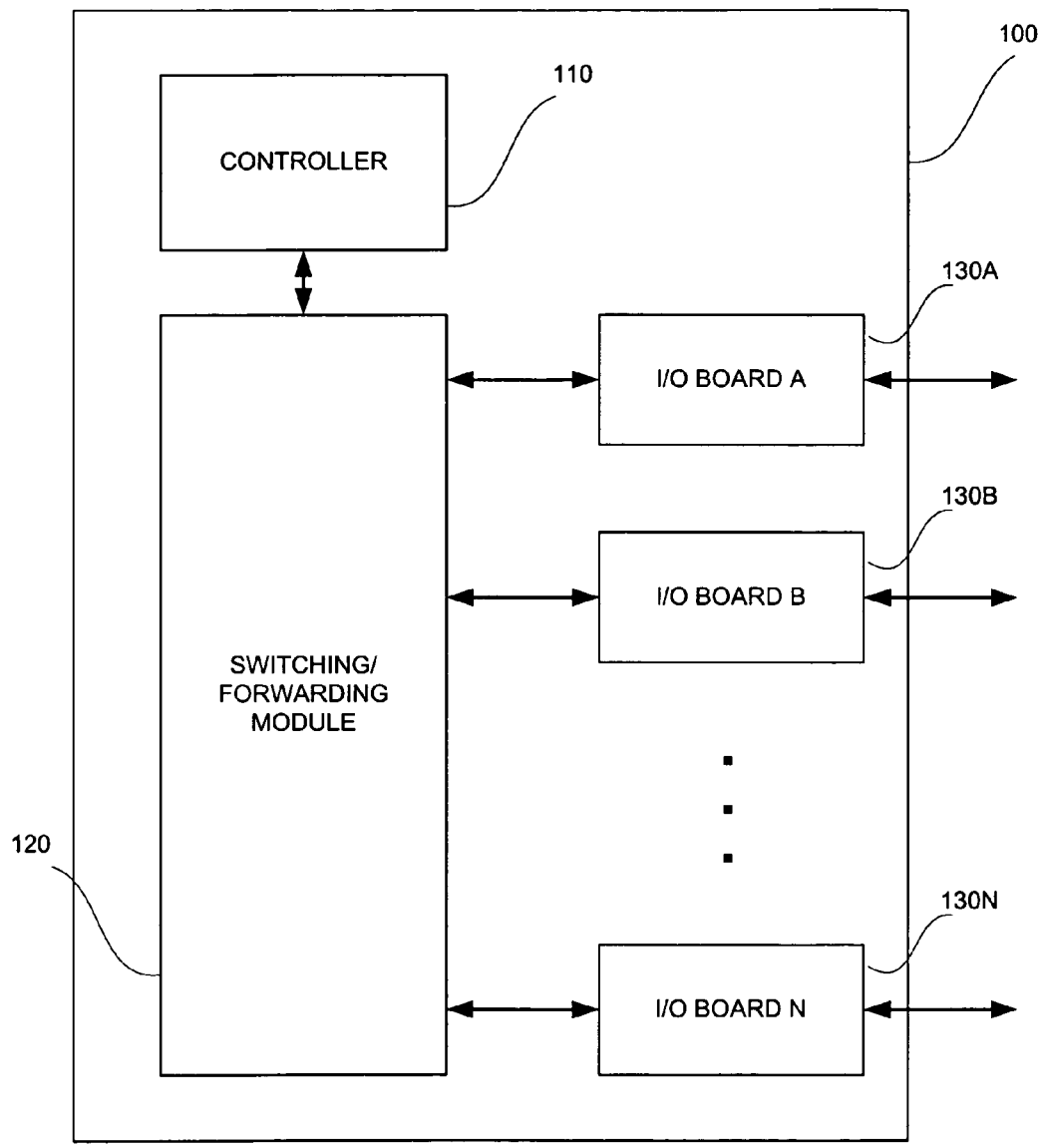
FIG. 1 is a block diagram of a generalized network device which may use the invention.

FIG. 1 is a diagram of an exemplary network device 100 in which systems and methods consistent with the present invention may be implemented. Network device 100 provides a generalized view of systems that may implement the invention. More detailed systems are shown in subsequent drawings.

As shown in FIG. 1, network device 100 includes controller 110, switching/forwarding module 120, and a plurality of I/O boards 130A–130N. While network device 100 may be a router or switch, it may also be any other type of network device that processes data packets received from one or more ingress links.

Controller 110 is responsible for general system management functions for network device 100. Such functions may include system configuration, diagnostic, system status and monitoring, statistical gathering, external communications, and updating internal tables, such as routing tables. Controller 110 may be implemented in hardware or software. While controller 110 is shown as a separate component, it may be integrated into any of the other components of network device 100.

Switching/forwarding module 120 switches or forwards data packets to the appropriate data paths. In one embodiment, switching/forwarding module includes hardware/software logic for interrogating data packets (or portions of the data packets) to determine their destination and causing the data packets to be forwarded to the appropriate data path according to a forwarding table. Switching/forwarding module may be implemented as a switch fabric or data crossbar and is preferably under the control of controller 110. In one embodiment, switching/forwarding module 120 receives data packets and forwards the data packets. In another embodiment, switching/forwarding module 120 receives portions of data packets (such as header information) and transmits instructions as to how data packets stored elsewhere should be forwarded.

I/O boards 130A–130N are a plurality of N boards that interface external data communication links to switching/forwarding module 120. In a preferred embodiment, I/O boards 130A–130N are responsible for processing streams of data and extracting data packets to be sent to the switching/forwarding module 120. Each of the I/O boards 130A–130N may be customized to handle specific types and speeds of data communication links.

Figure 2:
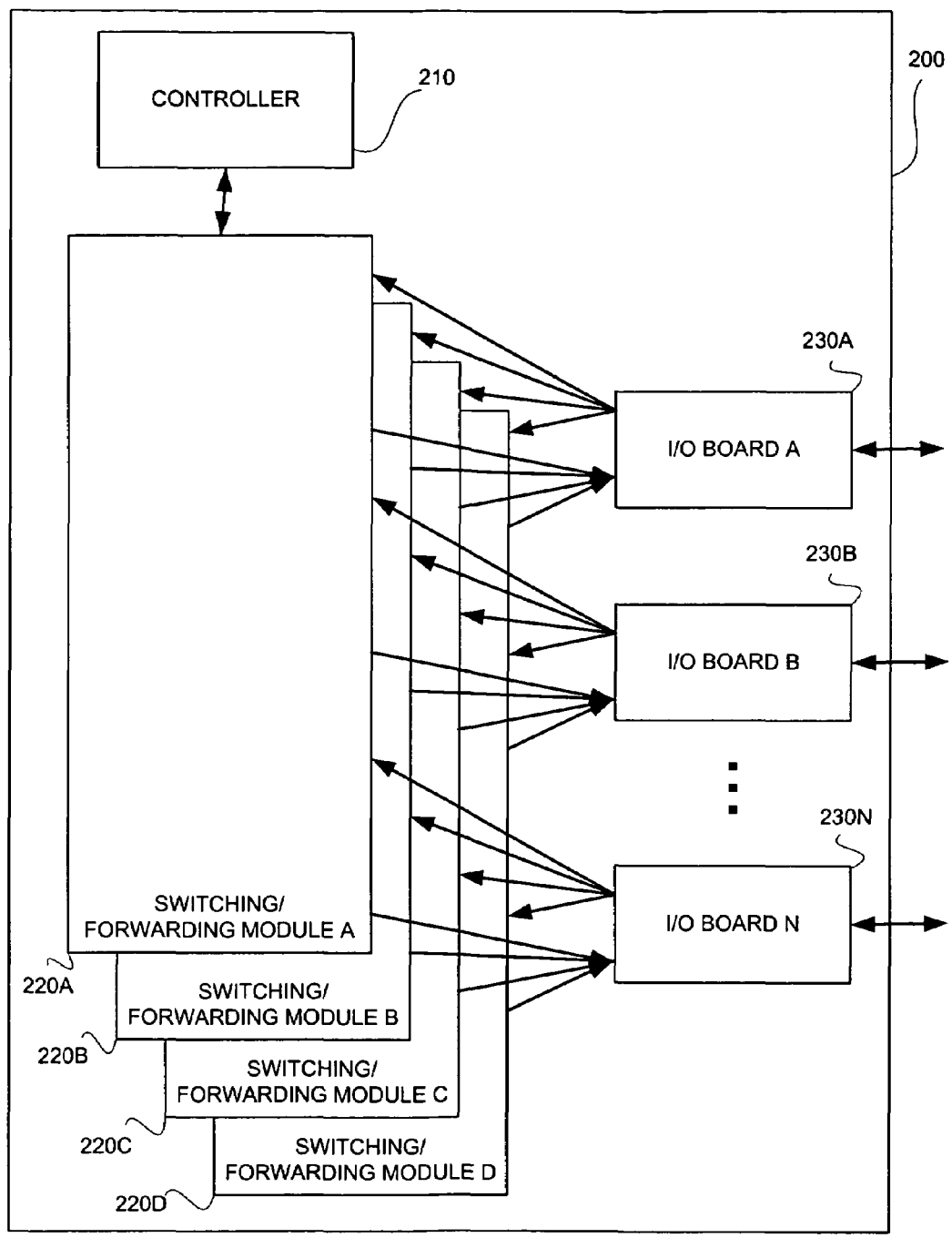
FIG. 2 is a block diagram of one embodiment of a network device consistent with the invention.

FIG. 2 shows network device 200. Network device 200 includes controller 210, a plurality of switching/forwarding modules 220A–220D, and a plurality of I/O boards 230A–230N.

Controller 210 provides similar functionality as controller 110, except that controller 210 preferably controls a plurality of switching/forwarding modules instead of a single switching/forwarding module and the flow of data to and from those switching/forwarding modules. Again, controller 210 may be implemented in either software or hardware and some or all of its functionality may be integrated into some of the other components of network device 200.

Each of switching/forwarding modules 220A–220D provides similar functionality as switching/forwarding module 120. While four switching/forwarding modules are shown in FIG. 2, the invention may be used with fewer or more switching/forwarding modules.

Each of I/O boards 230A–230N provides similar functionality as I/O boards 130A–130N. One difference shown in FIG. 2 is that each I/O board 230 contains a separate data path to each one of the plurality of switching/forwarding modules 220A–220D. One implementation of I/O board 230A is shown in greater detail in FIG. 3. While this implementation is shown for I/O board 230A, it may be used for any of I/O boards 230B–230N.

Figure 3:
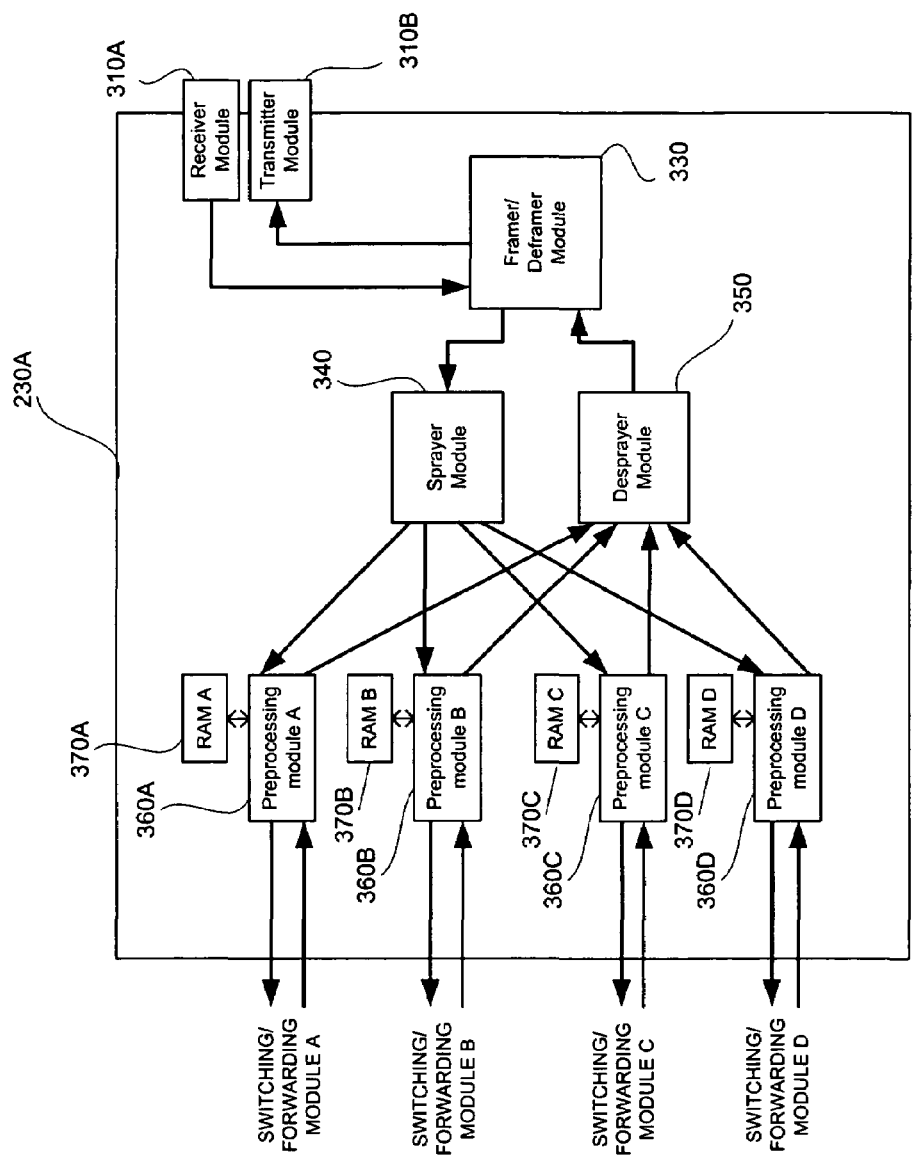
FIG. 3 is a block diagram of an I/O board used in the network device shown in FIG. 2.

As shown in FIG. 3, I/O board 230A includes receiver module 310A, transmitter module 310B, framer/deframer module 330, sprayer module 340, desprayer module 350, a plurality of preprocessing modules 360A–360D, and a plurality of corresponding RAMs 370A–370D. Receiver module 310A and transmitter module 310B connect to framer/deframer module 330. Sprayer module 340 and desprayer module 350 connect to framer/deframer module 330 and to each of the preprocessing modules 360A–360D. Each of the preprocessing modules 360A–360D connect to respective RAMs 370A–370D and connect to respective switching/forwarding modules. In a preferred embodiment, each of the components and modules of I/O board 230A is integrated on a separate chip/module and the chips/modules are mounted on a single board. Alternatively, the components and modules may be all integrated onto a single chip. In other embodiments, the functionality of the components and modules may all be integrated on one or more chips, which are mounted on one or more separate boards.

Receiver module 310A and transmitter module 310B connect I/O board 230A to an ingress and egress link, respectively. In a preferred embodiment, receiver module 310A and transmitter module 310B include optics and circuitry to connect to high-speed optical links, such as SONET OC-48, OC-192, OC-768, etc. Such optical components may be very short reach (VSR), short reach (SR), intermediate reach (IR), long reach (LR), very long reach (VLR), single mode, and/or DWDM. Receiver module 310A and transmitter module 310B preferably do not take a large amount of space (e.g., preferably less than 6 inches by 6 inches) or do not draw a large amount of power. Suitable modules are commercially available and are offered by optical vendors, such as Lucent.

For example, in one embodiment where the transmitter module connects to SONET OC-192 links, transmitter module 310B may receive 16 streams of parallel data at 622 MHz and serializes the data into a single 10 Gbit/second stream and converts it to an optical signal at 1550 nm for transmission on a single mode fiber. Receiver module 310A may receive a single 10 Gbit/second stream, convert it from an optical signal into an electrical signal, then disinterleave the stream into 16 streams of parallel data at 622 MHz.

Framer/deframer module 330 operates as a framer to extract data packets from an in-coming stream of data and as a deframer to form an out-going stream of data from data packets.

As a framer for in-coming data, framer/deframer module 330 receives an in-coming stream of data from receiver module 310A. The in-coming stream of data received by framer/deframer module 330 may be a single stream of data or may be multiple streams of data (e.g., 16 streams from receiver module 310A, as described in the above example). Framer/deframer module 330 deserializes the in-coming stream of data (i.e., forms multiple parallel streams from a single stream or forms additional parallel streams from multiple streams). Framer/deframer module 330 preferably has a multi-line internal bus corresponding to the number of streams to which the data has been deserialized. For example, framer/deframer module 330 converts 16 streams of data clocked at 622 MHz to 128 streams of data clocked at 77 MHz. In this example, framer/deframer module 330 preferably has a 128-line bus for extracting data packets from the 128 streams of data. In one embodiment, to extract data packets, framer/deframer module 330 may perform framing (such as SONET framing to identify the beginning and end of the packets) and other processing to prepare the data packets, such as removing link layer overhead (such as SONET and HDLC overhead), descrambling, and error checking.

As a deframer for out-going data, framer/deframer module 330 receives data packets and forms an out-going data stream. In a preferred embodiment, framer/deframer module 330 has a multi-line bus for processing the received data packets (e.g., 128-line bus). Framer/deframer module 330 identifies the beginning and end of data packets and processes the packets for transmission on an external communication link. Such processing may include adding appropriate link layer overhead (such as SONET and HDLC overhead), performing error detection calculations, and scrambling. Framer/deframer module 330 also serializes the data to form an out-going data stream. The out-going data stream may be a single stream of data or may be multiple streams of data (e.g., 16 streams for the transmitter module 310B, as described in the above example). In one embodiment, framer/deframer module 330 receives data packets on a 128-line bus clocked at 77 MHz, processes the packets for transmission, and converts the data into 16 streams of data clocked at 622 MHz.

Examples of implementations of a framer/deframer module 330 are described in U.S. patent application Ser. No. 09/637,709, entitled "Systems and Method For Packing Data into a Data Register," filed Aug. 15, 2000, to Padmanabhan et al. and U.S. patent application Ser. No. 09/706,752, entitled "Systems and Methods for Generating a Reliable Clock for Reception and Data Recovery," filed Nov. 7, 2000, to Padmanabhan et al. The contents of both applications are hereby incorporated by reference.

Sprayer module 340 receives data packets from framer/deframer module 330 and transmits them across a plurality of data paths. In a preferred embodiment, sprayer module 340 contains a plurality of output channels or outputs, each coupled to one of the plurality of data paths to a switching/routing module. There are various ways that sprayer module 340 may select the data path on which each data packet is sent. For example, sprayer module 340 may use a predetermined hash algorithm, a fixed pattern, randomly, or based on some mechanism for load balancing. Sprayer module 340 preferably includes a mechanism, such as injecting delay or packet tagging, to avoid reordering of data packets as they emerge from their respective data paths. In one embodiment, sprayer module 340 receives data packets from a single framer/deframer module across a multi-line bus (e.g., 128-line bus). In other embodiments, sprayer module 340 receives data packets from a plurality of framer/deframer modules, in which case bus lines are preferably allocated to each framer/deframer module for receiving data packets.

Desprayer 350 receives data packets from multiple data paths (or input channels connected to the data paths). In one embodiment, desprayer 350 combines the data packets received from the plurality of input channels into a single stream on a multi-line bus (e.g., 128-line bus) coupled to framer/deframer module 330.

Examples of implementations of the sprayer module and desprayer module are described in U.S. patent application Ser. No. 09/534,838, entitled "Bandwidth Division for Packet Processing," filed Mar. 24, 2000, to Dyckerhoff et al., and U.S. patent application Ser. No. 09/751,454, entitled "Bandwidth Division for Packet Processing," filed Jan. 2, 2001, to Dyckerhoff et al.

Preprocessing modules 360A–360D perform additional processing on the data packets before the data packets (or portions of the data packets) are sent to the respective switching/forwarding modules. Such additional processing may include removing Layer 2 overhead, extracting header information, and preparing the data packets for storage in memory. Preprocessing modules 360A–360D also perform memory management in storing data packets (or portions of data packets) in corresponding RAMs 370A–370D. Preprocessing modules 360A–360D may perform similar functions on data packets received from switching/forwarding modules 360A–360D, as well as other functions, such as packet encapsulation and header modification.

RAMs 370A–370D comprise memory for storing data packets and other related information. RAMs 370A–370D are preferably synchronous DRAMs. In other embodiments, RAMs 370A–370D may comprise other forms of memory. While RAMs 370A–370D are shown as separate components from preprocessing modules 360A–360D, they may be integrated into the same physical component.

Figure 4:
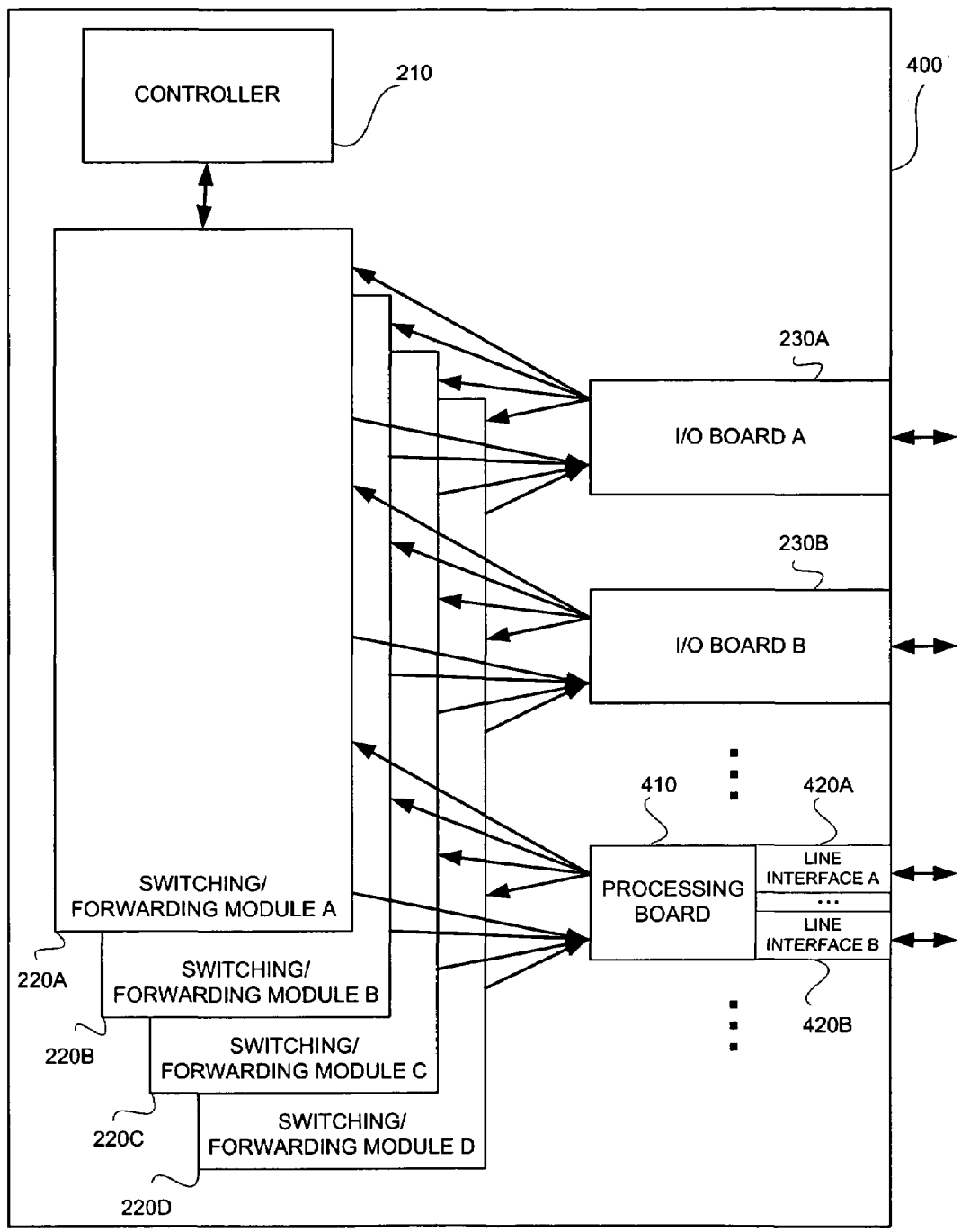
FIG. 4 is a block diagram of another embodiment of a network device consistent with the invention.

FIG. 4 shows another embodiment of a network device using the invention. Network device 400 includes similar components as contained in network device 200, except that network device 400 includes processing board 410 and line interfaces 420A–420B. Processing board 410 and line interfaces 420A–420B provide an alternative structure for interfacing communication links to a network device, consistent with the invention.

Figure 5:
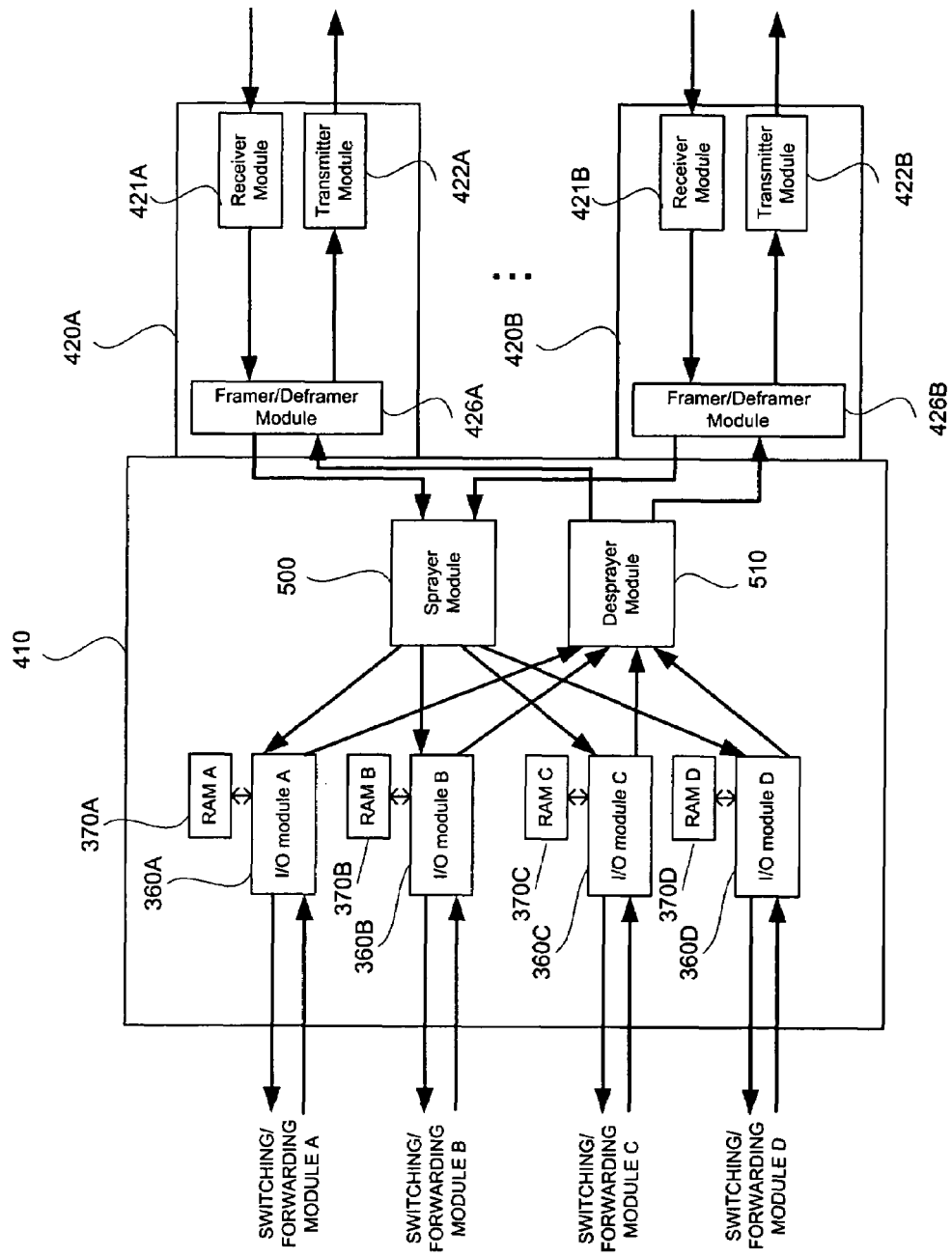
FIG. 5 is a block diagram of a processing board and line interfaces shown in FIG. 4.

Processing board 410 and line interfaces 420A–420B are shown in greater detail in FIG. 5. The components of processing board 410 are similar to those components shown in FIG. 3 having the same reference numerals. Sprayer module 500 performs similar functions as sprayer module 340, except that sprayer module 500 is connected to more than one framer/deframer module. Accordingly, sprayer module 500 preferably allocates a portion of its input lines to receiving data packets from one of the framer/deframer modules (e.g., framer/deframer module 426A) and the remaining input lines to receiving data packets from the other framer/deframer module (e.g., framer/deframer module 426B). While two framer/deframer modules are shown connected to sprayer module 500, more than two framer/deframer modules may be connected. In such a case, the appropriate number of input lines is preferably allocated to each of the connected framer/deframer modules. In addition, sprayer module 500 has logic for determining which data packets to process (e.g., spray) from framer/deframer module 426A and framer/deframer module 426B (or whatever framer/deframer modules are connected to the input of sprayer 500). In one embodiment, sprayer 500 contains a FIFO and data packets received from either framer/deframer module are added to the FIFO. Sprayer 500 processes the data packet that was added to the FIFO earliest.

Similar modifications and adjustments are preferably made to desprayer module 510. For example, desprayer module preferably maintains address information for each of the framer/deframer modules (or line interfaces) connected to desprayer 510. Certain output lines are allocated to each of the connected framer/deframer modules. When desprayer 510 receives data packets, it outputs the data packets to the appropriate framer/deframer module on the corresponding output lines.

Line interface 420A and 420B are similar and contain similar components. These components are similar to those shown in FIG. 3. The components are preferably compatible and support the appropriate type and speed of communication link for which it was designed.

Exemplary Methods

Exemplary methods consistent with the invention are now described. These methods may be described in connection with the exemplary apparatus described above or may be carried out by other apparatus.

Figure 6:
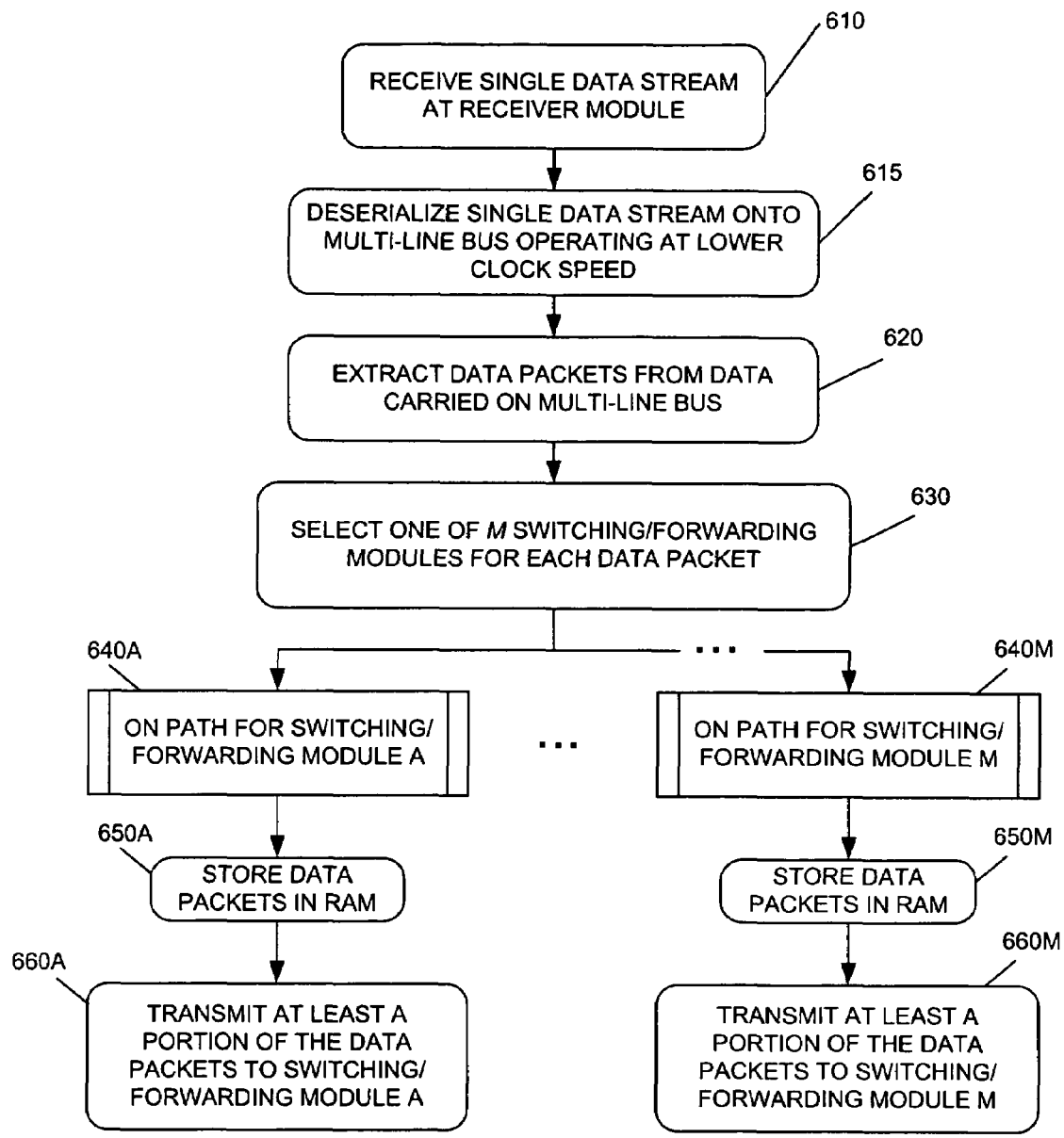
FIG. 6 shows a flow diagram of how an in-coming data stream is processed, consistent with the invention.

FIG. 6 shows a flow diagram of how an in-coming data stream is processed, consistent with the invention. A receiver module receives a single data stream (step 610). The single data stream is deserialized onto a multi-line bus operating at a lower clock speed than the receiver module (step 615). Data packets are extracted from the data carried on the multi-line bus (step 620). The data packets are sprayed across a plurality of data paths for processing. For example, one of a plurality of switching/forwarding modules may be selected for each data packet (step 630). For each path selected (steps 640A–640M), the data packets are stored in RAM (steps 650A–650M) and transmitted (or at least a portion of the data packets) to the respective switching/forwarding module (step 660A–660M).

Figure 7:
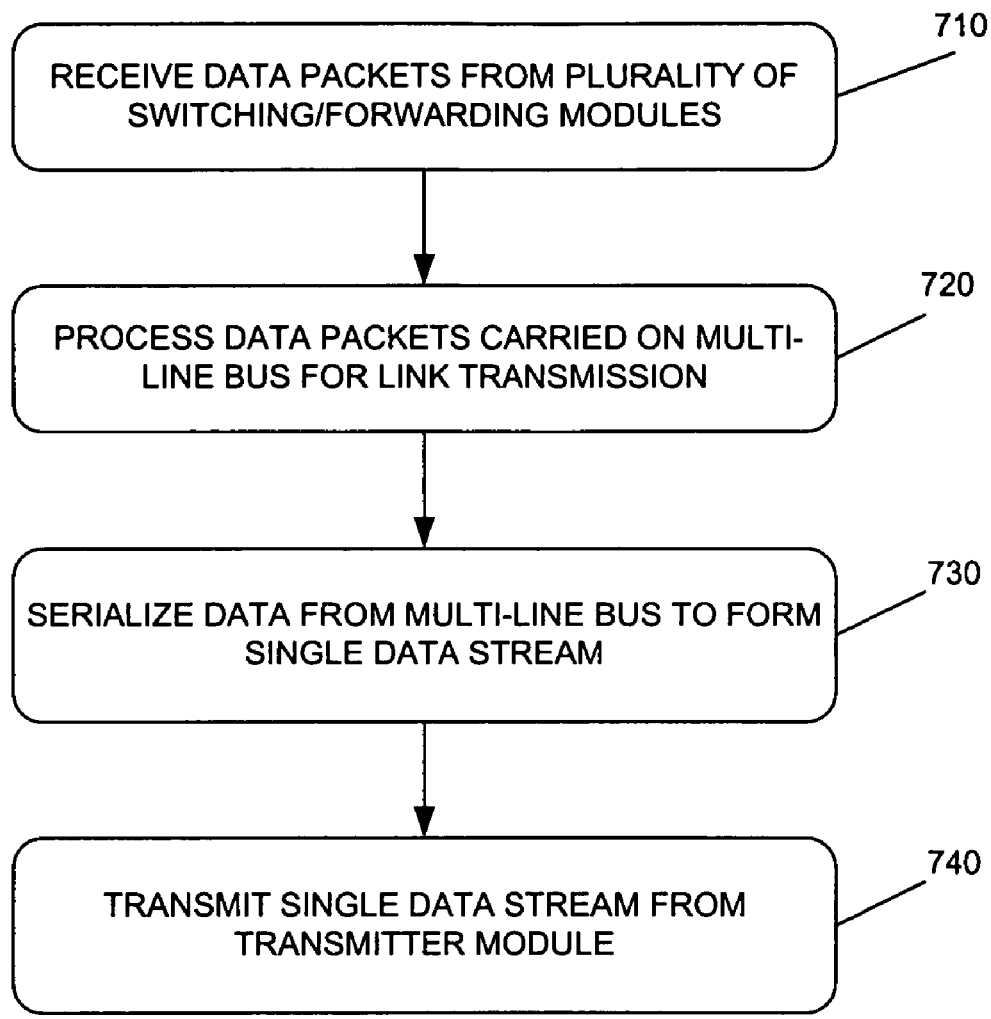
FIG. 7 shows a flow diagram of an out-going data stream is processed, consistent with the invention.

FIG. 7 shows a flow diagram of how an out-going data stream is processed. Data packets are received from a plurality of switching/forwarding modules (step 710). The data packets are carried on a multi-line bus and processed for link transmission (step 720). The data is serialized to form a single data stream (step 730) and transmitted from the transmitter module to the external communication link (step 740).

CONCLUSION

Systems and methods, consistent with the present invention, provide a high-speed line interface to provide sufficient processing and bandwidth without compromising performance.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. An apparatus for interfacing a high-speed link to a network device, comprising:
    a receiver module, operating at a first clock rate, for receiving a stream of in-coming data from the high-speed link;
    a framer module, operating at a second clock rate, for deserializing the stream of in-coming data onto a multi-line bus and extracting data packets from the deserialized data on the multi-line bus, wherein the second clock rate is lower than the first clock rate;
    a sprayer module to receive the extracted data packets from the framer module and, for each of the extracted data packets, select one of a plurality of processing paths in the network device and transmit the extracted data packet to the selected processing path;
    a deframer module, operating at the second clock rate, for receiving data packets and processing the data packets into a stream of out-going data for transmission on the high-speed link;
    a transmitter module, operating at the first clock rate, for transmitting the stream of out-going data onto the high-speed link; and
    a desprayer module for receiving data packets from the plurality of processing paths and transmitting the received data packets to the deframer module.

2. The apparatus according to claim 1, wherein the receiver module comprises optics and circuitry for receiving optical signals from a SONET OC-192 link.

3. The apparatus according to claim 1, wherein the receiver module comprises optics and circuitry for receiving optical signals from a SONET OC-768 link.

4. The apparatus according to claim 1, wherein the plurality of processing paths includes a plurality of preprocessing modules for processing the extracted data packets.

5. The apparatus according to claim 1, wherein the plurality of processing paths includes a plurality of switching/forwarding modules for switching or forwarding the extracted data packets.

6. The apparatus according to claim 4, wherein the sprayer module is configured to transmit each extracted data packet to one of the plurality of preprocessing modules based on a load balancing technique.

7. The apparatus according to claim 6, further comprising a plurality of memories, each memory corresponding to one of the plurality of preprocessing modules,
    wherein each preprocessing module comprises a memory management module for storing portions of data packets into its corresponding memory.

8. The apparatus according to claim 7, wherein the receiver module, the framer module, the sprayer module, the plurality of preprocessing modules, and the plurality of memories are mounted onto a single board.

9. The apparatus according to claim 7, wherein the receiver module, the framer module, the sprayer module, the plurality of preprocessing modules, and the plurality of memories are integrated onto a single chip.

10. An apparatus for interfacing at least one line interface card to a plurality of switching/forwarding modules of a network device, comprising:
    a plurality of preprocessing modules for processing data packets and transmitting the processed data packets to respective switching/forwarding modules;
    a sprayer module for receiving data packets from at least one line interface card and, for each received data packet, selecting one of the plurality of preprocessing modules and transmitting the received data packet to the selected preprocessing module; and
    a desprayer module for receiving data packets from the plurality of preprocessing modules and outputting the received data packets to the at least one line interface card.

11. The apparatus according to claim 10, further comprising a plurality of memories, each memory corresponding to one of the plurality of preprocessing modules,
    wherein each preprocessing module comprises a memory management module for storing portions of data packets into its corresponding memory.

12. The apparatus according to claim 11, wherein the plurality of preprocessing modules, the plurality of memories, and the sprayer modules are mounted onto a single board.

13. The apparatus according to claim 11, wherein the plurality of preprocessing modules, the plurality of memories, and the sprayer modules are integrated onto a single chip.

14. A networking device, comprising:
    a sprayer module for receiving data packets and, for each of the data packets, selecting one of a plurality of channels and outputting the data packet on the selected channel;
    a plurality of preprocessing modules for processing data packets, each preprocessing module receiving data packets from one of the channels of the sprayer module;
    a plurality of switching/forwarding modules, each switching/forwarding module receiving data packets from a corresponding one of the plurality of preprocessing modules; and
    a desprayer module for receiving data packets on a plurality of channels each corresponding to one of the plurality of preprocessing modules.

15. The networking device according to claim 14, further comprising:
    a framer module, operating at a first clock rate, for deserializing a stream of in-coming data onto a multi-line bus, extracting data packets from the deserialized data on the multi-line bus, and transmitting the extracted data packets to the sprayer module.

16. The networking device according to claim 15, further comprising:

a receiver module, operating at a second clock rate, for receiving a stream of in-coming data from a high-speed link and transmitting the stream of in-coming data to the framer module;

wherein the first clock rate is lower than the second clock rate.

17. The networking device according to claim 16, wherein the receiver module comprises optics and circuitry for receiving optical signals from a SONET OC-192 link.

18. The networking device according to claim 16, wherein the receiver module comprises optics and circuitry for receiving optical signals from a SONET OC-768 link.

19. The networking device according to claim 14, further comprising:

a deframer module, operating at a first clock rate, for receiving data packets from the desprayer module and processing the data packets into a stream of out-going data for transmission on a high-speed link.

20. The networking device according to claim 19, further comprising:

a transmitter module, operating at a second clock rate, for transmitting the stream of out-going data onto the high-speed link, wherein the first clock rate is lower than the second clock rate.

21. The networking device according to claim 20, wherein the transmitter module comprises optics and circuitry for transmitting optical signals onto a SONET OC-192 link.

22. The networking device according to claim 20, wherein the transmitter module comprises optics and circuitry for transmitting optical signals onto a SONET OC-768 link.

23. A method performed by a network device that includes a sprayer module and a desprayer module connected to a plurality of preprocessing modules, each of the preprocessing modules connecting to a switching or forwarding module, the method comprising:

receiving, by the sprayer module, a plurality of data packets from an in-coming link;

selecting, by the sprayer module for each of the data packets, one of the preprocessing modules;

outputting, by the sprayer module, each of the data packets to the selected preprocessing module;

receiving and processing, by the selected preprocessing module, data packets from the sprayer module;

outputting, by a first one of the preprocessing modules, a processed data packet to the switching or forwarding module;

switching or forwarding, by the switching or forwarding module, the processed data packet to a second one of the preprocessing modules;

receiving, by the desprayer module, the processed data packets from the preprocessing modules; and outputting, by the desprayer module, the received data packets for transmission on an out-going link.

* * * * *